(No Model.)  
2 Sheets—Sheet 1.

L. B. TEBBETTS.
INDEX.

No. 288,278. Patented Nov. 13, 1883.

Attest:  
Charles Pickles  
Albert G. Fish

Inventor:  
Lewis B. Tebbetts  
by C D Moody atty (No Model.)     L. B. TEBBETTS.     2 Sheets—Sheet 2.

INDEX.

No. 288,278.     Patented Nov. 13, 1883.

Attest,
Thos. L. Jones.
Paul Sinnfield

Inventor;
Lewis B. Tebbetts
by C. D. Moody
atty

UNITED STATES PATENT OFFICE.

LEWIS B. TEBBETTS, OF ST. LOUIS, MISSOURI.

INDEX.

SPECIFICATION forming part of Letters Patent No. 288,278, dated November 13, 1883.

Application filed April 11, 1883. (No model.)

*To all whom it may concern:*

Be it known that I, LEWIS B. TEBBETTS, of St. Louis, Missouri, have made a new and useful Improvement in Indexes, of which the following is a full, clear, and exact description, reference being had to the annexed drawings, making part of this specification, in which—

Figure 1:
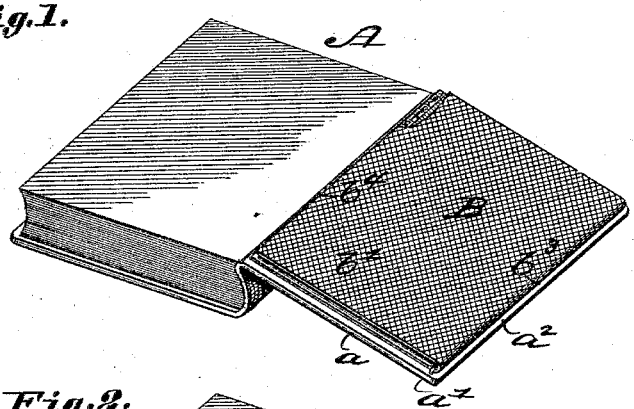
Figure 2:
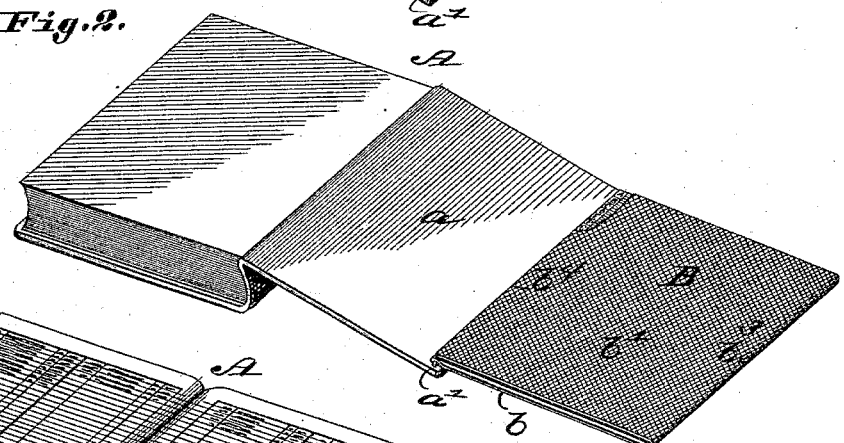
Figure 3:
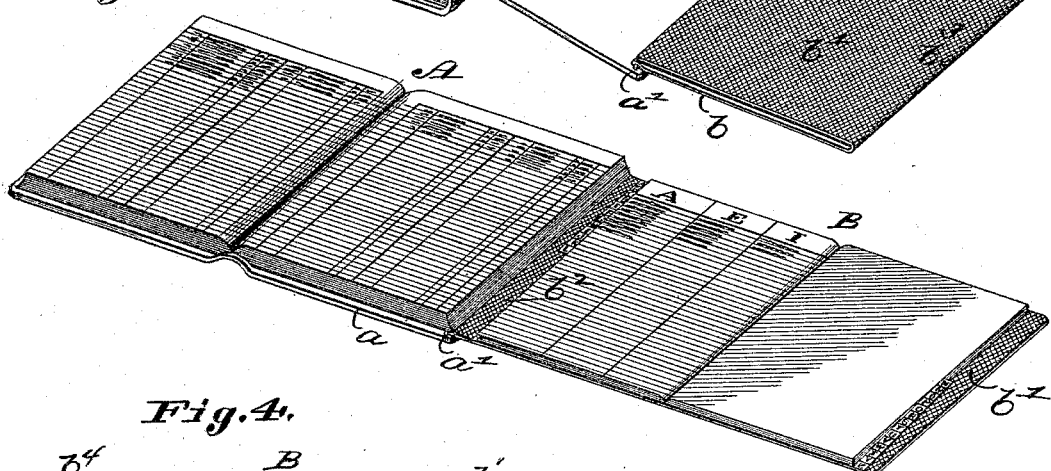
Figure 4:
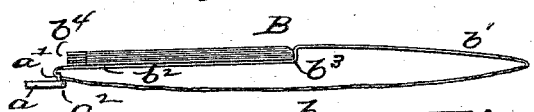
Figure 5:
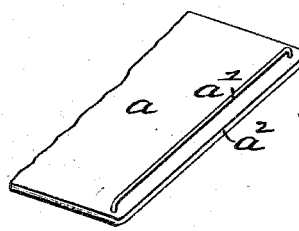
Figure 6:
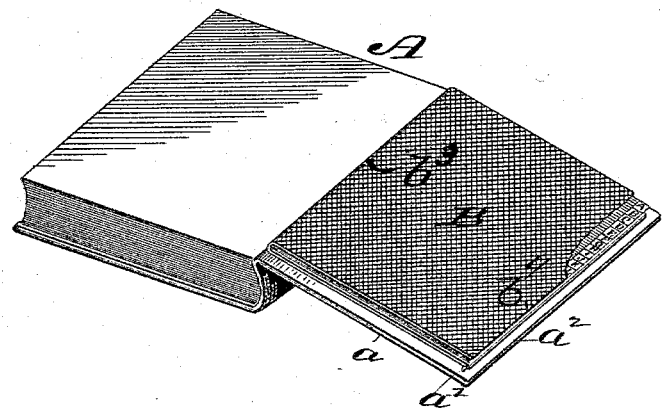

Figure 1 is a view in perspective of a book having the improvement, the book-cover being opened and the index being closed against the cover; Fig. 2, a similar view of the book, the index being drawn out; Fig. 3, a view showing the index drawn out from the book and both book and index being opened; Fig. 4, an edge elevation of the index; Fig. 5, a detail, being a view showing the outer portion of the book-cover, to which the index is attached; and Fig. 6, a view similar to that of Fig. 1, but having the back of the index turned inward.

The same letters of reference denote the same parts.

The present invention is an improvement in that class of indexes which are permanently attached to the books to which they belong, but capable of being drawn out therefrom, in order that both index and book may be simultaneously opened.

The improvement relates to the means of connecting the book and index.

Saving as modified by the improvement, the book A and the index B are of the usual kind. The index has a band, $b$, extending from the outer edge of one, $b'$, of the index-covers to the outer edge of the other, $b^2$, of the index-covers, and the book-cover, $a$, has an eye, $a'$, through which the band $b$ passes, as shown more distinctly in Fig. 4. This serves to connect the book and index, but in such manner as to enable the index to be slipped upon the eye $a'$ to and from the positions shown, respectively, in Figs. 1 and 2. In the position of Fig. 2 the book and index can both be simultaneously opened, as indicated in Fig. 3. The band $b$ and eye $a'$ also form a hinge, upon which the index can turn, enabling either the back $b^3$ or the front $b^4$ of the index to be turned into the book. In place of connecting the index immediately with the edge $a^2$ of the book-cover, the index might be connected with either the top or bottom edge of the book-cover, and at either the back or front of the book. A further modification would be dividing the band $b$ into two or more parallel bands. The eye $a'$ in such case may be of the form as shown; or there may be as many eyes as there are bands.

I claim—

The combination of the book A, having the eye $a'$, and the index B, having the band $b$, substantially as described.

LEWIS B. TEBBETTS.

Witnesses:
C. D. MOODY,
THOS. L. JONES.